United States Patent Office 2,992,728
Patented July 18, 1961

2,992,728
ELECTROSTATIC SEPARATION OF ISOMERIC MATERIALS
Ira M. Le Baron, Evanston, Ill., and Gene L. Samsel, Mulberry, Fla., assignors to International Minerals & Chemical Corporation, a corporation of New York
No Drawing. Filed Jan. 19, 1959, Ser. No. 787,382
16 Claims. (Cl. 209—2)

This invention relates to isomeric materials and more particularly, relates to an improved method for separating mixtures of isomers.

One of the more challenging problems confronting the chemical industry today is that of economically and efficiently effecting separations of isomeric mixtures. Some of the basic materials employed industrially at the present time are prepared in mixtures of either position or optical isomers, and must be isolated from such mixtures before being employed in an end use or in further reactions.

An outstanding example of a commercially available position isomer is found in p-xylene—a material employed in production of terephthalic acid, which in turn is used in the manufacture of the popular polyester fibers as well as in numerous other industrial processes. Yet the xylene produced in large quantities as an important byproduct of either petroleum refining or coal tar distillation is a mixture of ortho-, para- and meta-isomers. When it is noted that these isomers are liquids boiling at 144° C., 138.8° C., and 138.5° C., respectively, the difficulty and expense attending their separation by conventional means such as fractional distillation, is readily apparent. Similar difficulties are encountered with other well known mixtures of position isomers—both liquid and solid, such as those formed during the alkylation or halogenation of benzenes, the nitration of phenol, and the like.

The separation of specific optical isomers or enantiomorphs from their racemic mixtures has presented a similar problem to the chemical industry. Numerous α-amino acids, such as glutamic acid, are obtainable in the desired optically active form from various natural sources. For example, commercially important L-glutamic acid may be produced from Steffen's liquor or from wheat gluten. Synthetically produced glutamic acid, however, normally is obtained in a racemic form which must be resolved before the desired enantiomorph can be recovered. While various resolution procedures have been developed by the art, all leave considerable to be desired from a commercial standpoint.

In view of these and similar difficulties experienced by the art, the principal object of this invention is an improved method for separating mixtures of isomeric materials.

Another object of the invention is a method for efficiently separating mixtures of isomeric materials which does not require the expensive equipment and procedures currently employed by the art.

A further and more specific object of the invention is a method for efficiently and economically separating mixtures of position isomers.

An additional specific object of the invention is a method for efficiently and economically separating mixtures of optical isomers.

Yet another specific object of the invention is a method for separating different crystal species of a single crystalline isomeric compound.

A further object of the invention is an electrostatic method for separating an isomer from its admixtures with eutectics containing the said isomer.

A particular object of the invention is an electrostatic process for more economically and efficiently separating mixtures of isomeric materials.

Generally described, the present invention is a method for separating an isomeric mixture which comprises inducing the mixture while in solid, particulate form to accept differential electrical charges, and passing the differentially charged particles into an electrostatic field to separate therefrom a fraction rich in particles of one of the isomeric components of the said mixture.

The isomeric materials which may be separated in accordance with the invention may, in their natural form, be either solid or liquid. One embodiment of the method of the invention is applicable to mixtures of solid isomers wherein, for example, the isomers are present in the same crystal type, e.g. all monoclinic or all orthorhombic. The isomers also may be present in different crystal species, i.e., where one of the isomer crystals is monoclinic, another is orthorhombic, etc. Separations of different crystal types of a single isomer also may be effected. In the case of optical isomers, however, the method of the invention is applicable only when the enantiomorphs are present in a physical mixture as distinguished from a racemic compound. In accordance with a further embodiment of the invention, liquid mixtures of normally liquid isomers are reduced in temperature initially to effect a crystallization of the isomers and form a particulate, solid mixture of the various isomeric materials. The necessary temperature reduction may be accomplished in ways known to the art such as by refrigeration, treatment with Dry Ice, liquid nitrogen, and the like.

As will be described hereinafter in greater detail, particles or crystals of mixtures of normally solid or normally liquid isomers are induced to accept differential electrical charges and then passed into an electrostatic field to effect separation of a fraction rich in the desired isomer or enantiomorph. If necessary or desirable, the middlings and/or tailings may be recirculated to the electrostatic process either before or after the charging step. The concentrate also may be further concentrated by a plurality of passes through the electrostatic field either with or without a further charging step.

Mixtures of position isomers operable in the present invention include, without limitation, mixtures of alkylated benzene isomers such as the xylenes, trimethyl benzenes, tetramethyl benzenes, trimethoxy benzenes, and the like; mixtures of halogenated benzenes such as dichlorobenzene, trichlorobenzene and tetrachlorobenzene; the isomeric dichloroethanes; the hexachlorocyclohexanes; the cymenes (ortho-, meta- and para-isopropyltoluenese); the chlorophenols; the chlorotoluenes; the nitrophenols; the 1,1,1-trichloro-2,2-bis-(chlorophenyl) ethanes; the propyl benzenes; the monomethylnaphthalenes; the cresols; the chloronitrobenzenes; the xylenols; the phenols; the chloroanilines; the dioxanes; the amyl alcohols; the quinolines; the nicotinic acids; the phthalic acids; mixtures of maleic and fumaric acids; mixtures of quinene and quinidine; mixtures of ortho- and para-quinones and hydro-quinones; mixtures of anthracene and phenanthrene; and the like.

Optical isomer mixtures operable in the present invention include, without limitation, D,L-glutamic acid, D,L-α-chloro glutaric acid, D,L-α-hydroxyglutaric acid, D,L-tartaric acid, D,L-aspargine (D,L-α-aminosuccinamic acid), D,L-histidine (D,L-α-amino-β-imidazolepropionic acid), D,L-histidine monohydrochloride, D,L-mandelic acid, D,L-pimaric acid, D,L-α-chlorophenylacetic acid, D,L-malic acid, D,L-aspartic acid, D,L-lactic acid, D,L-α-bromobutyric acid, D,L-α-hydroxybutyric acid, and their derivatives such as their salts with acids and bases. Examples of such salts include, without limitation, the hydrohalide salts of D,L-glutamic acid, D,L-monosodium glutamate, D,L-monoammonium glutamate and similar salts of the other acids above listed.

In accordance with the invention, the particles preferably are induced to accept differential charges through the medium of contact electrification. Contact electrification results from the movement of matter in response to such stimuli as differences in escape rate of positive or negative charges, or transfer of electrons or ions across an interface due to differences in energy levels and the like. It has been determined that real crystals never attain the static perfection of ideal crystal lattices, and that a real crystal may have distorted surfaces, displaced ions or atoms, intersticial sites, surface sites, and charge displacement due to separated anion-cation pairs of abnormally ionized atoms and trapped electrons. It is postulated that these traps are capable of acting as donors and acceptors of electrons and it is these traps which are probably the controlling influence in contact electrification. In contact electrification, temperature, impurity content, and mechanical history of the various surfaces involved are the primary variables to be considered in determining the precise conditions requisite to optimum separations of particular materials.

Contact electrification preferably is obtained by essentially particle-to-particle contact of the material while the surfaces thereof are essentially dry. Ideally, the particles will not contact a metal or grounded metal surface during the charging operation, since donor plate charging, while operable, often results in the building up of negative charges on all of the particles of the mixture, thus rendering the problem one of separating particles having a different level of the same charge rather than the more desirable situation in which particles of opposite charge are being separated in the electrostatic field.

The desired particle-to-particle charging may be effected in numerous ways, such as by tumbling the particles down an elongated chute in such quantity that contact between the particles and the chute is at a minimum. Alternatively, the particulate material, while maintained at the desired temperature, may be delivered from a source of supply to the electrostatic separator by means of a vibrating trough. At commercial through-puts, the great preponderance of charging in this manner is engendered by particle-to-particle contact rather than by contact of the particles with the trough. Suitable charging also may be obtained by air agitation, tumbling in a suitable drum, and the like.

For optimum separations, it is desirable that surfaces of the particulate materials be substantially dry. Where temperature is not a particular problem and the particles of isomeric materials are solid and do not become sticky at temperatures somewhat above room temperature, it may be desirable to dry the particles by mild heating for a period of time requisite for removing substantially all moisture from the particle surfaces. Obviously, where the isomeric materials are sticky at room temperature, or are normally liquid and the crystallization and treatment necessarily must be carried out at reduced temperatures, the surfaces are most desirably dried by suitably contacting the particles with dry cold air. Surface moisture also may be removed by centrifuging or other well known process expedient. Vacuum drying may be employed in both high and low temperature drying procedures.

The electrostatic separator does not, per se, constitute a part of the present invention, and may be any one of the several commercially available designs. For example, a roll-type electrostatic separator, such as the well-known Johnson, Sutton, or Carpo Separators, may be employed. Preferably, however, the particulate isomeric mixture will be separated by passing the particulate materials as freely falling bodies through an electrostatic field. Desirably, the charge on the material will be substantially unaltered following the charging step as it is delivered to or passes through the electrostatic field. Thus, in the free-fall process any corona discharge causing bombardment of the field with ions or electrons or any contact which materially will effect alteration of the charge on the individual particle as it is introduced into or passed through the electrostatic field, preferably is avoided. In practicing the preferred free-fall process to separate the particulate isomeric material in accordance with the invention, it is desirable to employ apparatus which minimizes the possibility of altering the previously acquired charge with corona discharge or by exposing the previously charged material to inductive conduction, such as may be encountered in the roll-type separators previously referred to. Instead it is desirable to employ either flat plates or relatively large rolls or cylinders as electrodes which are specifically designed to minimize corona, and to avoid metal contact in the presence of the electrostatic field which will result in inductive conduction and/or any alteration of the charge on the particles.

When employing the "free-fall" electrostatic separation process, the surfaces of the opositely charged electrodes of the electrostatic separator desirably will be positioned or formed at an angle to the normal path of flow of the material if undiverted by the electrostatic forces. Such arrangement of electrodes is provided to make the angle of the divergency as great as possible, thus permitting the separation of materials with dividers to be accomplished more readily. Although a variety of electrostatic apparatus may be employed in conducting the process of this invention, it is preferred that the electrostatic field be created by one or more pairs of spaced, oppositely charged electrodes, the lower portions of which curve outwardly from the perpendicular. The pair of electrodes desirably is secured in place by members with smooth, convex surfaces. Although the field gradient may vary considerably, it has been found that gradients of from 6,000 to 15,000 volts per inch are sufficient for most separations. The preferred type of free-fall apparatus is more specifically disclosed and described in U.S. Patent 2,738,875.

The method of the invention is applicable to a wide variety of particle sizes. The particle size which must be employed to give optimum separation for a particular material is dependent largely on the strength of the electrostatic field and the residence time of the particle in the field. Thus, in the preferred free-fall type of separator, the maximum particle size desirable will depend on the voltage gradient and the length of the electrodes. It will be apparent that larger and heavier particles may be separated where the field strength is high and/or where the length of the drop between the electrodes is such as to provide additional time for the attractive and repulsive forces in the field to act on the differentially charged particles. Particles substantially finer than about 150 mesh normally are not desirable when employing roll-type separators, although considerably smaller particles usually may be employed in a free-fall separator. In general, particles of from about 10 to about 150 mesh are preferred when employing a roll-type separator, and particles ranging between 20 and 250 mesh are preferred for free-fall type separators. It will be understood that optimum mesh sizes will vary from substance to substance and with the particular process conditions employed.

Having generally described the present invention, the following examples are presented to illustrate specific embodiments thereof:

*Example I*

A 50–50 mixture of meta- and para-nitrophenol was prepared. Both meta- and para-nitrophenol appear in solid form as yellow monoclinic crystals, the meta-isomer melting at 96° C. and the para-isomer at 114° C. The crystals in the mixture were characterized by a particle size of −20+80 mesh. The mixture of isomer crystals was agitated at room temperature to effect contact electrification by particle-to-particle contact, and then dropped in a thin stream through an electrostatic field produced by spaced, vertically disposed electrodes and characterized by a field gradient of about 10,000 volts per inch. The particulate material was caught in a series of eight pans disposed beneath the electrodes. The following results were obtained:

|  | Assay, percent | | Recovery, percent | |
| --- | --- | --- | --- | --- |
|  | Pans 1, 2, 3 | Pans 5, 6, 7, 8 | Pans 1, 2, 3 | Pans 5, 6, 7, 8 |
| Meta-nitrophenol | 85 | 5 | 68 | 4 |
| Para-nitrophenol | 15 | 95 | 12 | 46 |

It will thus be seen that a 95% para-nitrophenol concentrate was obtained at 46% recovery, while 85% meta-nitrophenol concentrate was obtained at 68% recovery.

*Example II*

Orthohombic D-glutamic acid and monoclinic L-glutamic acid were admixed in 50-50 ratio and dried overnight under vacuum at 60° C. When charged by contact electrification and dropped through the free-fall electrostatic separator as described in Example I, the following results were obtained:

|  | Assay, percent L-GA | | Recovery, percent L-GA | |
| --- | --- | --- | --- | --- |
|  | Pans 1, 2, 3, 4 | Pans 5, 6, 7, 8 | Pans 1, 2, 3, 4 | Pans 5, 6, 7, 8 |
| Monoclinic L-GA | 61.3 | 26.7 | 65 | 35 |
| Orthorhombic D-GA | 39.7 | 73.3 | 35 | 65 |

*Example III*

Orthorhombic and monoclinic L-glutamic acid were mixed in a 50-50 ratio and dried overnight under vacuum at 60° C., were charged by contact electrification at room temperature and were dropped through the electrostatic field of a free-fall separator as in Example I. The positively charged material reporting to the negative electrode was 90% monoclinic L-glutamic acid.

*Example IV*

A mixture of $-40+150$ mesh crystals of D- and L-glutamic acid hydrochloride (D, L-GA·HCl) was dried overnight at 90° C. under vacuum. When the crystals were charged by contact electrification and dropped through the free-fall electrostatic separator as in Example I, the following results were obtained:

| Assay, percent L-GA·HCl | | Recovery, percent L-GA·HCl | |
| --- | --- | --- | --- |
| Pans 1, 2, 3, 4 | Pans 5, 6, 7, 8 | Pans 1, 2, 3, 4 | Pans 5, 6, 7, 8 |
| 61.4 | 35.5 | 63 | 37 |

*Example V*

A 50-50 mixture of $-100+200$ mesh L- and D-monoclinic ammonium glutamate (D,L-MAG) was prepared and dried at room temperature under vacuum. The crystals were charged by contact electrification and dropped through the free-fall electrostatic separator as in Example I with the following results:

| Assay, percent L-MAG | | Recovery, percent L-MAG | |
| --- | --- | --- | --- |
| Pans 1, 2, 3, 4 | Pans 5, 6, 7, 8 | Pans 1, 2, 3, 4 | Pans 5, 6, 7, 8 |
| 10 | 90 | 10 | 90 |

*Example VI*

L-glutamic acid having a mesh size of $-35$ was admixed in equal proportions with $-200$ mesh D,L-glutamic acid present as a racemic compound. The mixture was differentially charged by particle-to-particle contact and passed through a free-fall type electrostatic separator as in Example I. Pans 1, 2, and 3 contained essentially 100% D,L-glutamic acid racemic compound. Pans 6, 7, and 8 contained better than 90% L-glutamic acid.

*Example VII*

A 50-50 mixture of 1, 2, 3 trichlorobenzene (TCB) and 1, 3, 5 trichlorobenzene was prepared. The mixture of crystals was cooled to $-40°$ C., induced to accept differential charges by contact electrification and dropped through a free-fall electrostatic separator, all as described in Example I. The following results were obtained:

| Assay, percent 1,3,5-TCB | | Recovery, percent 1,3,5-TCB | |
| --- | --- | --- | --- |
| Pans 1, 2, 3, 4 | Pans 5, 6, 7, 8 | Pans 1, 2, 3, 4 | Pans 5, 6, 7, 8 |
| 32.5 | 75 | 41 | 59 |

*Example VIII*

Ortho- and para-dichlorobenzenes were separately cooled below the point of crystallization and the resulting crystals were admixed in equal proportions, maintained at a temperature of $-40°$ C. and screened to obtain a feed of $-20$ mesh. The $-20$ mesh feed material was differentially charged by particle-to-particle contact and passed through a free-fall electrostatic separator as in Example I. The material collected in pans 1, 2, and 3 assayed 87% para-dichlorobenzene while the material collected in pans 6, 7, and 8 assayed 80% ortho-dichlorobenzene.

*Example IX*

Ortho- and para-xylenes were separately cooled below the point of crystallization and the resulting crystals were admixed in equal proportions, maintained at a temperature of $-78°$ C. and were screened to obtain a fraction of $-20$ mesh. The $-20$ mesh material was differentially charged by particle-to-particle contact and passed through a free-fall electrostatic separator as in Example I. The material collected in pans 1, 2, and 3 assayed 71% para-xylene and that collected in pans 6, 7, and 8 assayed 90% ortho-xylene.

*Example X*

Ortho-, and meta-, and para-xylenes were separately cooled with liquid nitrogen below the point of crystallization, the resulting crystals were admixed in equal proportions and maintained at a temperature of $-192°$ C. and were screened to obtain a fraction of $-20$ mesh. The $-20$ mesh material was differentially charged by particle-to-particle contact and passed through a free-fall electrostatic separator as in Example I. Since meta- and para-xylenes cannot be distinguished by gas chromatography, an infrared analysis also was conducted to indicate the relative proportions of meta- and para-isomers present. The material collected in the various pans assayed:

| Pan | Gas chromatography | | Infrared analysis | | |
| --- | --- | --- | --- | --- | --- |
|  | Ortho-, percent | Meta- and para-, percent | Ortho-, percent | Meta-, percent | Para-, percent |
| 1 | 5 | 95 | 12 | 46 | 42 |
| 2 | 9 | 91 | 14 | 45 | 41 |
| 3 | 12 | 88 | 18 | 41 | 41 |
| 4 | 17 | 83 | 20 | 50 | 30 |
| 5 | 24 | 76 | 27 | 50 | 23 |
| 6 | 59 | 41 | 57 | 24 | 19 |
| 7 and 8 | 63 | 37 | 55 | 25 | 20 |

Example XI

A mixture containing 85% ortho-dichlorobenzene and 15% para-dichlorobenzene (an eutectic mixture) was prepared and cooled to —50° C. with liquid nitrogen. The resulting solid was ground and screened to give a —20 mesh fraction. This —20 mesh material was then cooled in liquid nitrogen and added to an equal amount of similarly cooled —20 mesh para-dichlorobenzene. The —20 mesh material was differentially charged by particle-to-particle contact and passed through a free-fall electrostatic separator as in Example I. The material collected in the various pans assayed:

Pans:
1, 2, 3 _____percent para-__ 88
5 _____percent ortho-__ 77
6, 7, 8 _____percent ortho-__ 93

The analysis of pans 1, 2, and 3 showed a good separation of para-isomer from the eutectic mixture of ortho- and para-isomers. The analysis of pans 6, 7, and 8 also indicated that the eutectic was separated to a certain extent into its component parts.

Example XII

Para- and meta-xylenes were separately cooled with liquid nitrogen below the point of crystallization. The resulting crystals were maintained below their melting point, were screened to obtain a —20 mesh material, and the —20 mesh fractions were mixed in equal proportions. The —20 mesh mixture was then passed through a free-fall electrostatic separator as in Example I. The material collected in the various pans assayed as follows:

| Pan | Percent para-xylene | Percent meta-xylene |
| --- | --- | --- |
| 1 | 47 | 53 |
| 2 | 46 | 54 |
| 3 | 43 | 57 |
| 4 | 32 | 68 |
| 5 | 41 | 59 |
| 6 | (1) | |
| 7 and 8 | 85 | 15 |

1 Accidentally lost.

Example XIII

Ortho- and meta-xylenes were separately cooled with liquid nitrogen to below the point of crystallization. The resulting crystals, while maintained below their melting point, were screened to obtain a —20 mesh material and the —20 mesh fractions were mixed in equal proportions. The —20 mesh mixture was then passed through a free-fall electrostatic separator as in Example I. The material collected in the various pans assayed as follows:

| Pan | Percent ortho-xylene | Percent meta-xylene |
| --- | --- | --- |
| 1 | 42 | 58 |
| 2 | 44 | 56 |
| 3 | 50 | 50 |
| 4 | 63 | 37 |
| 5 | 60 | 40 |
| 6 | 73 | 27 |
| 7 and 8 | 65 | 35 |

In considering the results of the separations described in the foregoing examples, it will be appreciated that only a single pass through the electrostatic field was made. Fractions having even higher concentration of the desired isomer or isomers readily can be obtained by employing a plurality of fields or a plurality of passes through a single field. Similarly, yields readily may be increased by recycling the middling fractions.

From the foregoing general description and specific illustration, it is apparent that isomeric materials may be efficiently and economically separated by passing crystalline mixtures thereof through an electrostatic separator in accordance with the process of this invention. Since many modifications of the process herein disclosed will become apparent to those skilled in the art, it is desired that the scope of the invention be limited solely by the scope of the appended claims.

What is claimed is:

1. A process for separating a mixture of isomeric materials which comprises inducing the mixture in solid particulate form to accept differential electrical charges, and passing the differentially charged particles into an electrostatic field to separate a fraction rich in particles of one of the isomeric components of the said mixture.

2. A process according to claim 1 in which the surfaces of the particles are dried before being passed into the electrostatic field.

3. A process according to claim 1 in which the particles are charged by contact electrification.

4. A process for separating a mixture of position isomers which comprises inducing the mixture in solid particulate form to accept differential electrical charges, and passing the differentially charged particles into an electrostatic field to separate a fraction rich in particles of one of the isomeric components of the said mixture.

5. A process according to claim 4 in which the mixture contains isomeric nitrophenols.

6. A process according to claim 4 in which the mixture contains polyhalogenated benzenes.

7. A process according to claim 4 in which the mixture contains trichlorobenzene isomers.

8. A process for separating a mixture of optical isomers which comprises inducing the mixture in solid particulate form to accept differential electrical charges, and passing the differentially charged particles into an electrostatic field to separate a fraction rich in particles of one of the isomeric components of the said mixture.

9. A process according to claim 8 in which the mixture is a racemic mixture of an α-amino acid.

10. A process according to claim 9 in which the mixture is a racemic mixture of glutamic acid.

11. A process according to claim 9 in which the mixture is a racemic mixture of glutamic acid hydrochloride.

12. A process according to claim 9 in which the mixture is a racemic mixture of monosodium glutamate.

13. A process for separating a mixture of different crystal species of a single isomeric material which comprises inducing the mixture in solid particulate form to accept differential electrical charges, and passing the differentially charged particles into an electrostatic field to separate a fraction rich in the desired crystal species.

14. A process according to claim 13 in which the mixture separated is a mixture of orthorhombic and monoclinic crystals of an enantiomer of glutamic acid.

15. A process according to claim 13 in which the mixture separated is a mixture of orthorhombic and monoclinic crystals of an enantiomer of a glutamic acid salt.

16. A process for separating an isomeric material from its admixtures with an eutectic of said isomeric material and at least one other isomer of said isometric material which comprises inducing the mixture in solid particulate form to accept differential electrical charges, and passing the differentially charged particles into an electrostatic field to separate a fraction rich in particles of the said isomeric material.

References Cited in the file of this patent

Industrial and Engineering Chemistry 32, (5) May, 1940, pages 600–604.